United States Patent
Toda et al.

(10) Patent No.: US 6,363,799 B1
(45) Date of Patent: Apr. 2, 2002

(54) BEARING DEVICE AND METHOD FOR MEASURING AXIAL FORCE

(75) Inventors: Kazutoshi Toda, Osaka; Tomohiro Ishii, Nara; Shinichirou Kashiwagi; Tadashi Mitarai, both of Osaka; Makoto Miyazaki, Aichi, all of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/631,901

(22) Filed: Aug. 4, 2000

(30) Foreign Application Priority Data

| Aug. 6, 1999 | (JP) | ........................................... 11-224170 |
| Nov. 10, 1999 | (JP) | ........................................... 11-319178 |
| Nov. 29, 1999 | (JP) | ........................................... 11-337055 |
| Mar. 9, 2000 | (JP) | ....................................... 2000-064999 |

(51) Int. Cl.$^7$ ................................................ G01L 5/12
(52) U.S. Cl. .............................. 73/862.49; 73/862.392; 384/448
(58) Field of Search ........................ 73/118.1, 862.392, 73/862.49; 384/448

(56) References Cited

U.S. PATENT DOCUMENTS 4,336,641 A    6/1982  Bhatia
4,904,107 A  * 2/1990  Fukulawa et al. .......... 403/122
5,078,531 A  * 1/1992  Salkai et al. ................. 403/140
5,148,779 A  * 9/1992  Okuse et al. .................. 123/90
5,226,738 A    7/1993  Valette et al.
5,448,119 A  * 9/1995  Kono et al. .................... 310/67
5,822,859 A   10/1998  Kessen et al.

FOREIGN PATENT DOCUMENTS

| DE | 19748664 | 6/1998 |
| EP | 0323159 | 7/1989 |
| EP | 0854303 A2 | 7/1998 |
| EP | 0927651 | 7/1999 |
| GB | 2323823 | 10/1998 |

* cited by examiner

Primary Examiner—Max Noori
(74) Attorney, Agent, or Firm—Jordan and Hamburg LLP

(57) ABSTRACT

There is disclosed a bearing device in which a double row angular contact ball bearing is mounted to an outer periphery of a hub wheel, a caulking portion is bent diametrically outward and caulked on an end face of an inner ring of a bearing, thereby preventing the bearing from falling out from the bearing device and to applying a pre-load to the bearing. An axially outer edge of the inner ring is chamfered roundly, the caulking portion is provided at its shaft end with a small-diameter portion, and a starting point of the small-diameter portion is located closer to an axially central portion than a chamfer-starting point of the axially outer edge of the inner ring.

15 Claims, 11 Drawing Sheets

F I G. 1
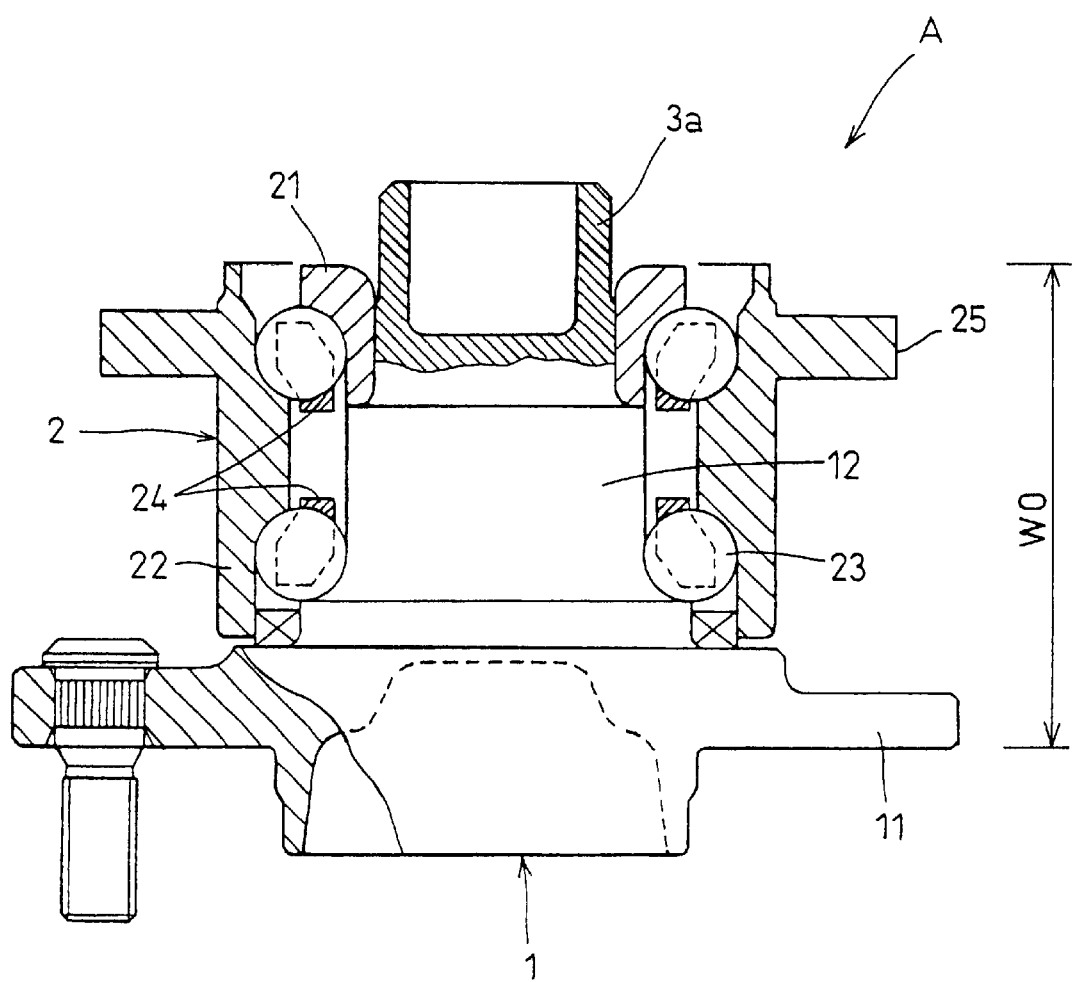

F I G. 7
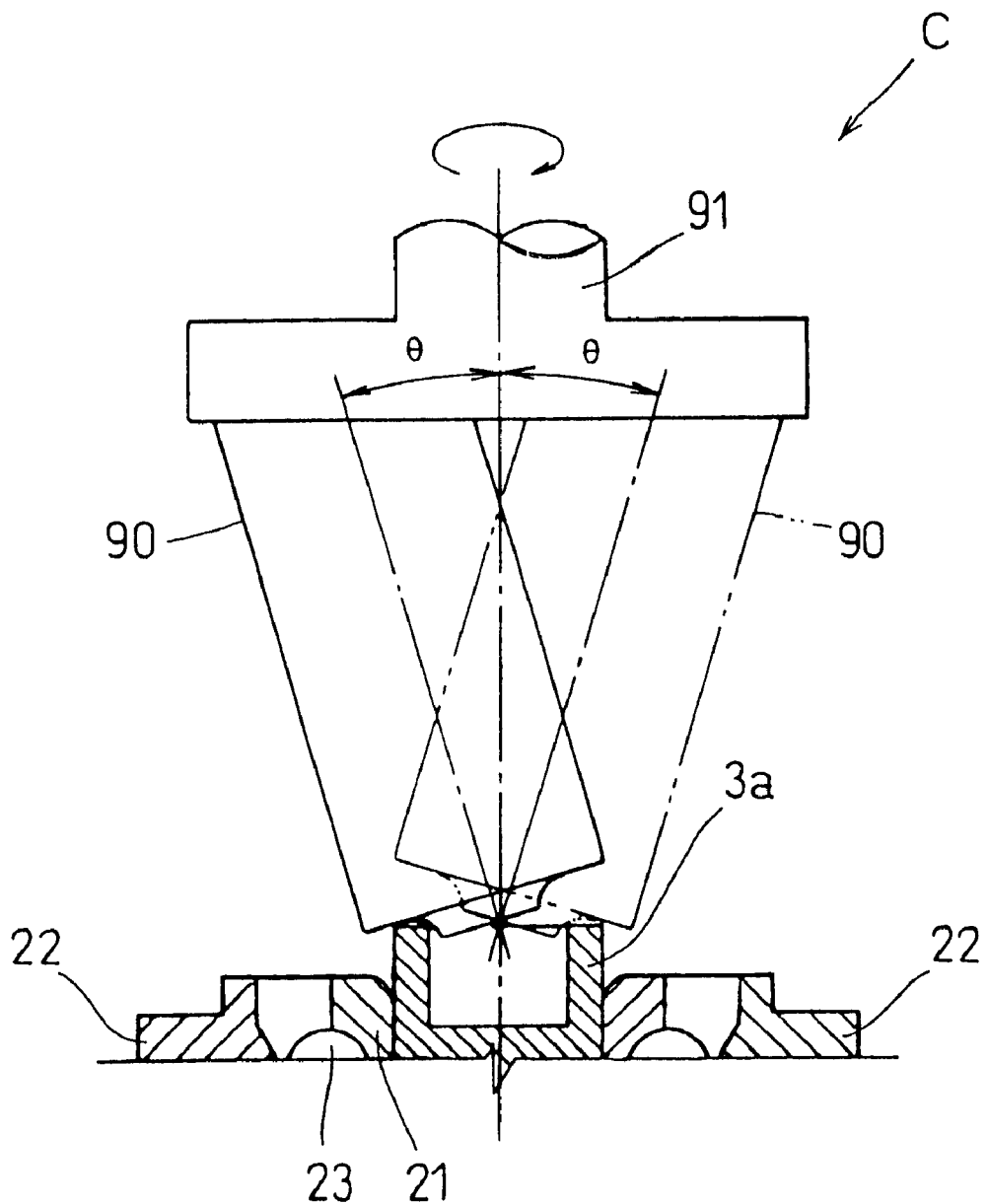

F I G. 11
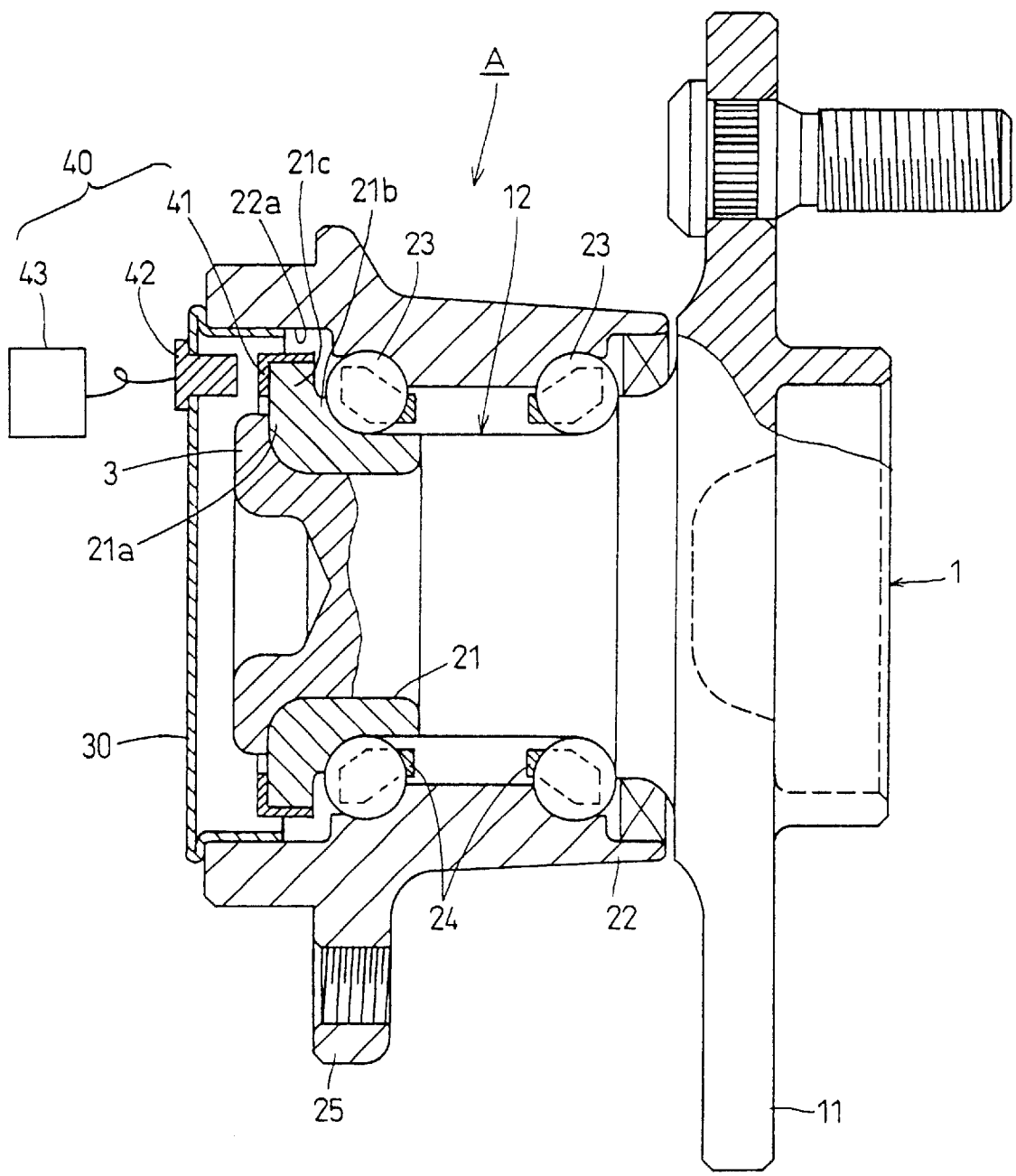

BEARING DEVICE AND METHOD FOR MEASURING AXIAL FORCE

BACKGROUND OF THE INVENTION

The present invention relates to a bearing device such as a hub unit mounted to a vehicle such as an automobile for example, and to a method for measuring an axial force of the bearing device.

In a conventional hub unit for a vehicle, a rolling bearing of an angular contact type is attached to an outer periphery of a hub wheel, a cylindrical shaft end of the hub wheel is bent diametrically outward by rotary forging and caulked on an end face of an inner ring of the rolling bearing, thereby applying a pre-load to the rolling bearing and preventing the rolling bearing from loosening from the hub unit.

When the caulking operation is carried out, in order to inhibit a caulking force from being applied to the inner ring of the rolling bearing and to inhibit a raceway of the inner ring from being deformed, an annular support jig is used.

When the shaft end of the hub wheel is bent and caulked in the diametrically outward direction, this support jig restrains an outer periphery of a shoulder portion of the inner ring to inhibit the inner ring from being deformed.

This support jig is necessary for improving the performance of the hub unit, but it is troublesome to insert the support jig between the opposed inner ring and outer ring of the rolling bearing so as to bring the support jig into abutment against the outer periphery of the inner ring shoulder portion.

Moreover, even if the inner ring shoulder portion is restrained by the support jig, since the inner ring can be deformed by the rotary forging in this structure, it is necessary to carry out, with high precision, the rotary forging operation itself, therefore and there is a limit for increasing the speed of the operation thereof. For this reason, the conventional hub unit structure is inferior in mass production performance.

SUMMARY OF THE INVENTION

Accordingly, it is an object of the present invention to provide a bearing device suitable for mass production and in which the number of assembling steps and assembling time are reduced by making the inner ring such that it is less prone to be deformed so that the precision of the bearing is not affected even if a support jig is not used.

It is another object of the present invention to provide a method for measuring an axial force of the bearing device which can be assembled without using the support jig and which was assembled without restraining the inner ring using the support jig.

Other objects, features and advantages will be apparent from the following description.

According to the first embodiment of the invention, there is provided a bearing device comprising a shaft body having a shaft end formed into a cylindrical shape as a caulking portion; and an angular contact type rolling bearing fitted over an outer periphery of the shaft body; wherein an axially outer edge of an inner ring of the rolling bearing is partially chamfered roundly with a predetermined radius of curvature, the caulking portion comprises a large-diameter portion having an outer diameter substantially coinciding with an inner diameter of an inner periphery of the inner ring and fitted to the inner periphery of the inner ring, and a small-diameter portion having an outer diameter smaller than the inner diameter of the inner ring and extended axially in one axial direction from the large-diameter portion through a predetermined distance, a starting point of the small-diameter portion is located closer to an axially central portion than a chamfer-starting point of the axially outer edge of the inner ring, and the small-diameter portion of the caulking portion is bent diametrically outward and caulked on an end face of the inner ring of the rolling bearing so as to prevent the rolling bearing from falling out from the bearing device and to apply a pre-load to the rolling bearing.

According to the first embodiment of the invention, since the small-diameter portion is smaller than the inner diameter of the inner ring, when it is subjected to a rotary forging using a forging tool for example, a force for deforming the inner ring diametrically outward is not applied to the inner ring. In this state, since the starting point of the small-diameter portion is located closer to the axially central portion than the chamfer-starting point of the axially outer edge of the inner ring, when it is subjected to a rotary forging using a forging tool for example, the small-diameter portion is deformed diametrically outward such that it is extended in the vicinity of the starting point.

When the outer periphery of the small-diameter portion came into contact with the axially outer edge of the inner ring, the force for deforming the inner ring diametrically outward became smaller, a deforming force for deteriorating the circularity of the inner ring is not applied to the inner ring, and as a result, the inner ring is not deformed, and the caulking portion is caulked on the end face of the inner ring as a caulked portion.

From the above reason, according to the first embodiment of the invention, the support jig is unnecessary and thus, the number of assembling steps and assembling time are reduced, and the structure of the hub unit is suitable for mass production.

Preferably, in the first embodiment of the invention, the shaft body is a wheel hub to which a wheel is mounted, the wheel hub having a shaft portion comprising a small-diameter outer peripheral face and a large-diameter outer peripheral face, a shaft end of the shaft portion is the caulking portion, the rolling bearing is a double row angular contact ball bearing having an inner ring of a single raceway fitted over the small-diameter outer peripheral face of the shaft portion of the wheel hub, a single outer ring having two row raceway grooves, a plurality of balls arranged in two rows, and two crown-shaped retainers, the large-diameter outer peripheral face of the shaft portion of the wheel hub is one inner ring, the axially outer edge of the inner ring of the rolling bearing is partially chamfered roundly with a predetermined radius of curvature, and the small-diameter portion of the caulking portion is bent diametrically outward and caulked on an end face of the inner ring of the rolling bearing so as to prevent the rolling bearing from falling out from the bearing device and to apply a pre-load to the rolling bearing.

Further, in the first embodiment of the invention, it is preferable that the small-diameter portion of the caulking portion includes, before the small-diameter portion is caulked, a junction having a tapered face which is reduced in diameter in one axial direction from a starting point of the small-diameter portion, and a shaft end extending in one axial direction from the junction. In this case, the small-diameter portion can smoothly extend along an inner periphery of the inner ring in a state in which the small-diameter portion is not in contact with the inner periphery of the inner ring, and it is effective to prevent the inner ring from being warped by the caulking.

It is preferable that in the first embodiment of the invention, an outer diameter difference between the large-diameter portion and the small-diameter portion of the caulking portion before the small-diameter portion is caulked is 0.1 mm or less. This is preferable because the small-diameter portion can be caulked in a state in which the small-diameter portion is tightly connected to the inner ring without a gap in the caulked state.

According to a second invention, there is provided a bearing device comprising a shaft body whose shaft end is formed into a cylindrical shape as a caulking portion; and an angular contact type rolling bearing fitted over an outer periphery of the shaft body; wherein a counter bore-opposite side shoulder portion in an inner ring of the rolling bearing is provided with a swelling portion which extends diametrically outward with respect to a standard specification product, a thickness of the counter bore-opposite side shoulder portion in the diametrical direction is increased by the swelling portion, the caulking portion of the shaft body is bent diametrically outward and caulked on a counter bore-opposite side end face of the inner ring of the rolling bearing so as to prevent the rolling bearing from falling out from the bearing device and to apply a pre-load to the rolling bearing.

According to the second embodiment of the invention, since the volume of the counter bore-opposite side end face is increased and the section modulus is increased, the rigidity of the counter bore-opposite side end face is increased.

When the forging tool is rolled to bend and deform the caulking portion diametrically outward and the caulking portion is caulked on the end face of the counter bore-opposite side end, the caulking force is applied to the counter bore-opposite side end of the inner ring. In this case since the counter bore-opposite side end has a great rigidity, it is not deformed by the caulking. Therefore, the raceway of the inner ring is not deformed by the caulking and thus, the circularity of the raceway is maintained, and the precision of the bearing is maintained.

Further, the counter bore-opposite side end is not deformed by the caulking, a tensile stress in the circumferential direction is not applied to the raceway of the inner ring by the caulking and as a result, fatigue of the bearing is reduced and the life span is not shortened by the caulking.

Further, since the thickness of the entire inner ring is not set thick, it is unnecessary to reduce the inner diameter of the inner ring. Therefore, the inner ring can be caulked without deforming the inner ring while maintaining the strength of the shaft.

From the above reason, according to the second embodiment of the invention, the support jig is unnecessary and thus, the number of assembling steps and assembling time are reduced, and the structure of the hub unit is suitable for mass production.

According to a third embodiment of the invention, there is provided an axial force measuring method including a preparing process and an actually working process, the preparing process comprises, a first preparing step for measuring an initial axial size of the bearing device before it is caulked, a second preparing step for varying an axial force applied to the rolling bearing to measure an axial size at that time, and a third preparing step for obtaining a deviation (a variation amount of the axial size) between the initial axial size measured in the first preparing step and a result of measurement in the second preparing step, thereby producing correlation data between the axial force and the variation amount of axial size, and the actually working process comprises a first actually working step for measuring an actually working axial size of the bearing device after it is caulked, a second actually working step for obtaining a deviation (a variation amount of the axial size) between the actually working axial size in the first actually working step and the initial axial size, and a third actually working step for collating the obtained variation amount of the axial size and the correlation data to recognize an axial force.

BRIEF DESCRIPTION OF THE DRAWINGS

These and other objects as well as advantages of the invention will become clear by the following description of preferred embodiments of the invention with reference to the accompanying drawings, wherein:

FIG. 1 is a longitudinal sectional side view of a hub unit for a vehicle before a shaft end is caulked according to a first preferred embodiment of the present invention;

FIG. 7 is a view showing steps for explaining a caulking form;

FIG. 11 is a longitudinal sectional side view of the hub unit according to a third preferred embodiment of the present invention.

DETAILED DESCRIPTION OF THE INVENTION

Referring to FIG. 1 to FIG. 7, a hub unit for a vehicle which is one example of a bearing device according to a first preferred embodiment of the present invention will be explained.

A hub unit A includes a hub wheel 1 to which a wheel is mounted as a shaft body, and a double row angular-contact ball bearing 2 (bearing, hereinafter) which is one example of an angular-contact type rolling bearing.

The hub wheel 1 includes a shaft portion 12. A shaft end 3a of the shaft portion 12 is formed cylindrically, and is bent from a state shown in FIG. 1 diametrically outward to assume a state shown in FIG. 2.

Figure 2:
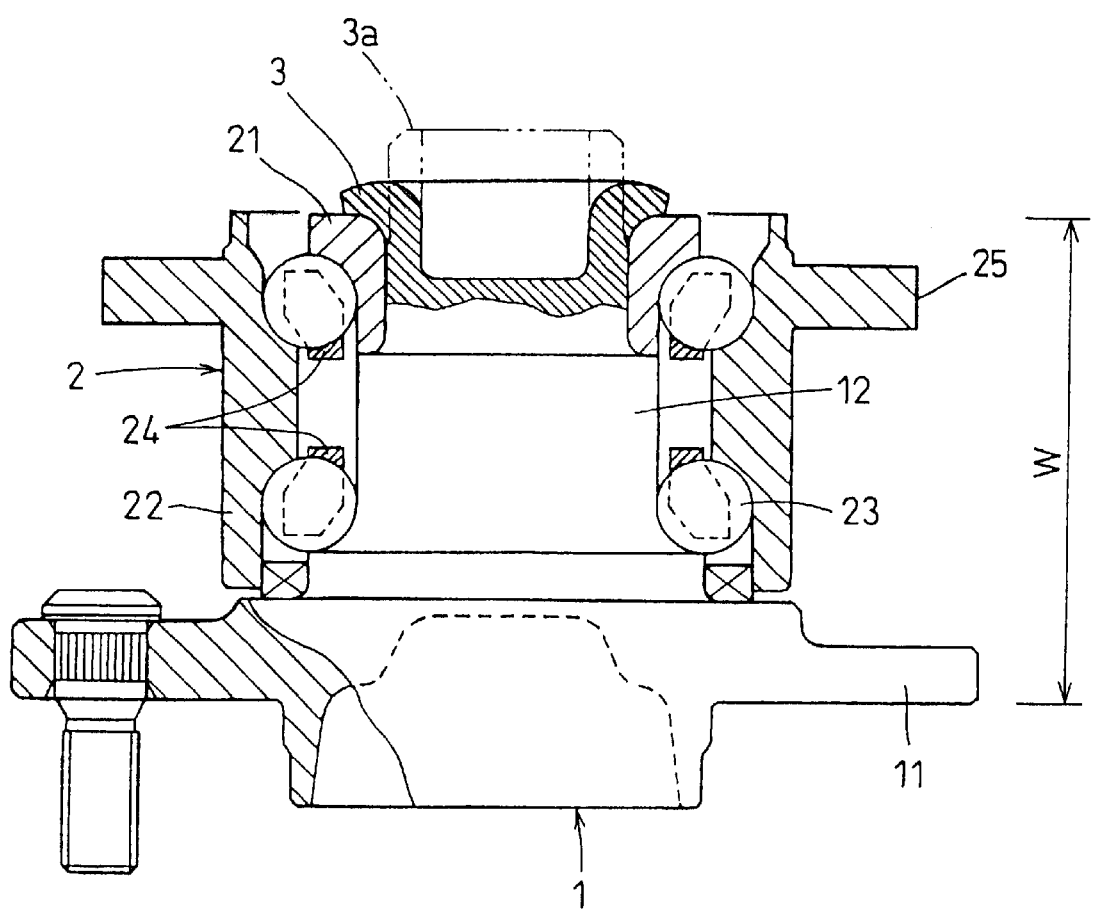
FIG. 2 is a longitudinal sectional side view of the hub unit for the vehicle after the shaft end was caulked in FIG. 1.

For convenience of explanation, a shaft end in a state shown in FIG. 1 is called a caulking portion 3a, and a shaft end in a state shown in FIG. 2 is called a caulked portion 3.

The bearing to which the present invention is applied is not limited to an angular-contact ball bearing only, and a rolling bearing such as a counter bore ball bearing, a single row angular contact ball bearing, a double row tapered roller bearing are included.

The hub wheel 1 includes an annular flange 11 and a shaft portion 12 provided with a small-diameter outer peripheral face and a large-diameter outer peripheral face in the axial direction.

A bearing 2 is fitted over the small-diameter outer peripheral face of the shaft portion 12.

The bearing 2 includes an inner ring 21 having a single raceway fitted over the small-diameter outer peripheral face of the shaft portion 12, a single outer ring 22 having raceway grooves in two rows, a plurality of balls 23 as rolling elements disposed in two rows, and two crown-shaped retainers 24.

In the bearing 2, the large-diameter outer peripheral face of the shaft portion 12 of the hub wheel 1 is formed as one inner ring.

As the inner ring 21, an inner ring of a general single row angular contact ball bearing is used as it is.

A flange 25 directing diametrically outward is provided on an outer periphery of the outer ring 22. The flange 25 is mounted to an axle case (not shown) non-rotatably.

In the case of the first embodiment according to the present invention, a conventional support jig is unnecessary as will be explained with reference to FIGS. 3 to 7.

Figure 3:
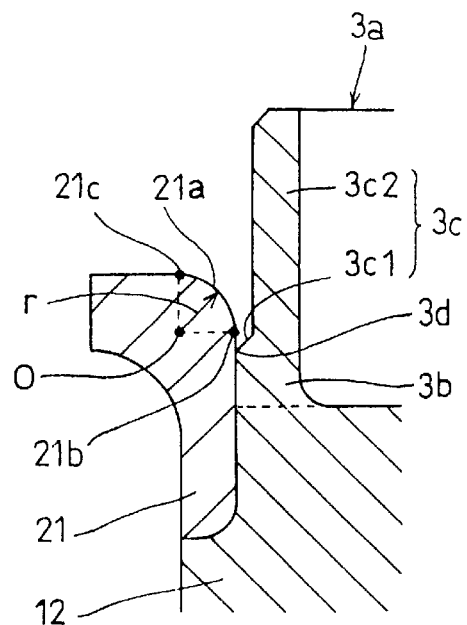
FIG. 3 is enlarged view of a portion of FIG. 1 for explaining the caulking.

As shown in FIG. 3, an angled portion 21*a* of an axially outer edge of the inner ring 21 is rounded. For example, the angled portion 21*a* in a region from a chamfering-starting point 21*b* to a chamfering-ending point 21*c* is chamfered into ¼ of a circumference of radius of curvature r with respect to the center 0 or smaller (a straight portion may exist).

The chamfering-starting point 21*b* is a point of intersection between a vertical line directing diametrically inward from the center 0 and the angled portion 21*a*.

The caulking portion 3*a* is cylindrical in shape, and comprises a large-diameter portion 3*b* having an outer diameter that substantially coincides with an inner diameter of the inner ring 21 along an inner circumference thereof, and a small-diameter portion 3*c* having an outer diameter smaller than the inner diameter of the inner ring 21 and extending through a required distance in one of the axial direction from the large-diameter portion 3*b*.

Because the large-diameter portion 3*b* is fitted over the inner circumference of the inner ring 21, it is preferable that the large-diameter portion 3*b* is grained to a finish.

The small-diameter portion 3*c* is subjected to turning to have small diameter.

The small-diameter portion 3*c* further comprises a junction 3*c1* having a tapered face which is tapered in one axial direction, and a shaft end 3*c2* extending in one axial direction.

A starting point 3*d* of the small-diameter portion 3*c*, i.e., a starting point 3*d* of the junction 3*c1* is positioned closer to the axially center portion of the inner ring 21 than the chamfering-starting point 21*b*.

An outer diameter difference (step) between the large-diameter portion 3*b* and the small-diameter portion 3*c*, a step between the inner diameter of inner ring 21 and the shaft end 3*c2* of the small-diameter portion 3*c* is set to 0.1 mm or less.

If the step is 0.1 mm or less, a gap is not generated between the inner ring 21 and the caulked portion 3. If the step exceeds 0.1 mm, the probability that the gap is generated is increased.

A bending operation of the caulking portion 3*a* diametrically outward will be explained.

In brief, a forging tool 90 in a rotary-forging device C shown in FIG. 7 is inclined through a required angle θ with respect to the caulking portion 3*a* and abutted against the caulking portion 3*a* and rolled.

For clarifying the illustration, the forging tool 90 is not illustrated in FIGS. 3 to 6.

Figure 4:
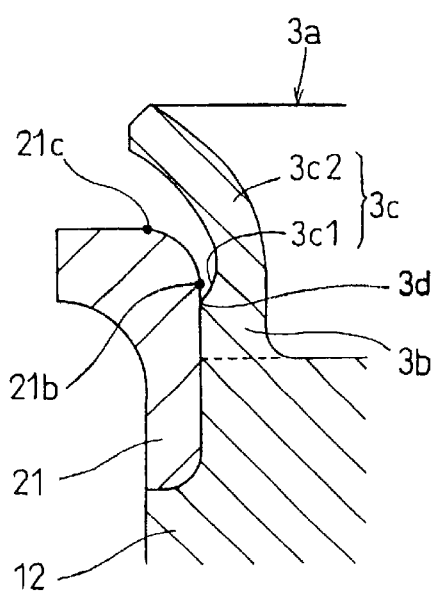
FIG. 4 is a view corresponding to FIG. 3 for explaining the caulking.

The junction 3*c1* of the small-diameter portion 3*c* is extended by the rolling as shown in FIG. 4.

Figure 5:
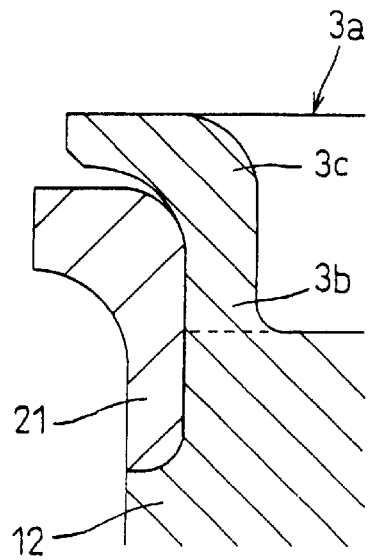
FIG. 5 is view corresponding to FIG. 3 for explaining the caulking.

If further rolled, the junction 3*c1* of the small-diameter portion 3*c* and the shaft end 3*c2* are bent along the angled portion 21*a* as shown in FIG. 5.

Figure 6:
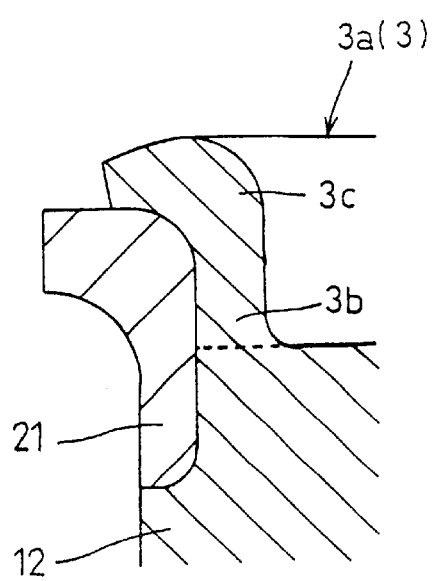
FIG. 6 is enlarged view of an essential portion of FIG. 2 for explaining the caulking.

Finally, as shown in FIG. 6, the small-diameter portion 3*c* is elastically bent diametrically outward and pushed against an inner end face of the inner ring 21 as the caulked portion 3.

The reason why the support jig is unnecessary will be explained.

A caulking force at the time of rolling of the forging tool 90 is a sum of a diametrically outward component of force and a component of force in an axially center direction. A caulking force (deformation force) for deforming a raceway of the inner ring 21 is a diametrically outward component of force.

In the case of the rolling of the forging tool 90 in a state shown in FIG. 3, the diametrically outward component of force becomes maximum. In the state of FIG. 3, the starting point 3*d* of the small-diameter portion 3*c* is located closer to the axially center portion than the chamfering-starting point 21*b*.

For this reason, as shown in FIGS. 3 and 4, the shaft end 3*c2* is deformed diametrically outward such that the junction 3*c1* of the small-diameter portion 3*c* is extended.

In this case, a diametrically outward component of force is not applied to the inner ring 21 because the small-diameter portion 3*c* is not in contact with the inner ring 21 and thus, the inner ring 21 is not deformed.

In FIG. 5, the entire junction 3*c1* of the small-diameter portion 3*c* and a portion of the shaft end 3*c2* are in contact with the angled portion 21*a* of the inner ring 21. At this point of time, the diametrically outward component of force is small and component of force on the axially central side increases.

This axially central side component of force is not applied to the inner ring 21 as a deformation effort, which impairs the circularity of the inner ring 21. Therefore, the inner ring 21 is not deformed by this caulking, and the caulking portion 3*a* is caulked on the end face of the inner ring 21 as the caulked portion 3 as shown in FIG. 6.

As described above, according to the hub unit of the first embodiment, the adverse probability that the inner ring 21 is deformed is largely reduced, the number of assembling steps and assembling time are reduced, and the structure of the hub unit is suitable for mass production.

The present invention can be applied to a general bearing device in which a wheel hub is used as a shaft body and the angular contact type rolling bearing is disposed on the outer periphery of the shaft portion of this shaft body.

Figure 8:
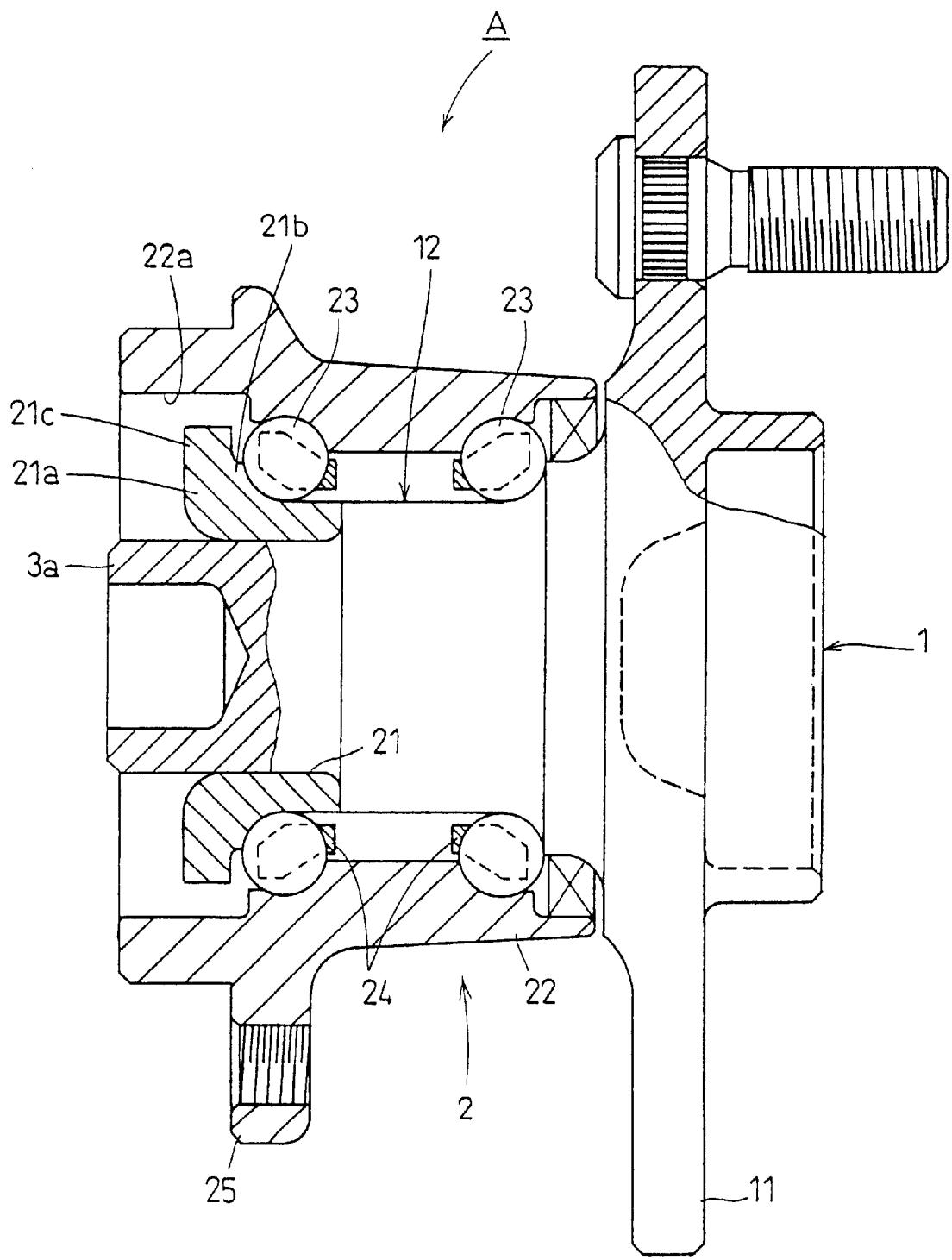
FIG. 8 is a longitudinal sectional side view of the hub unit for the vehicle before the shaft end is caulked according to a second preferred embodiment of the present invention.
Figure 9:
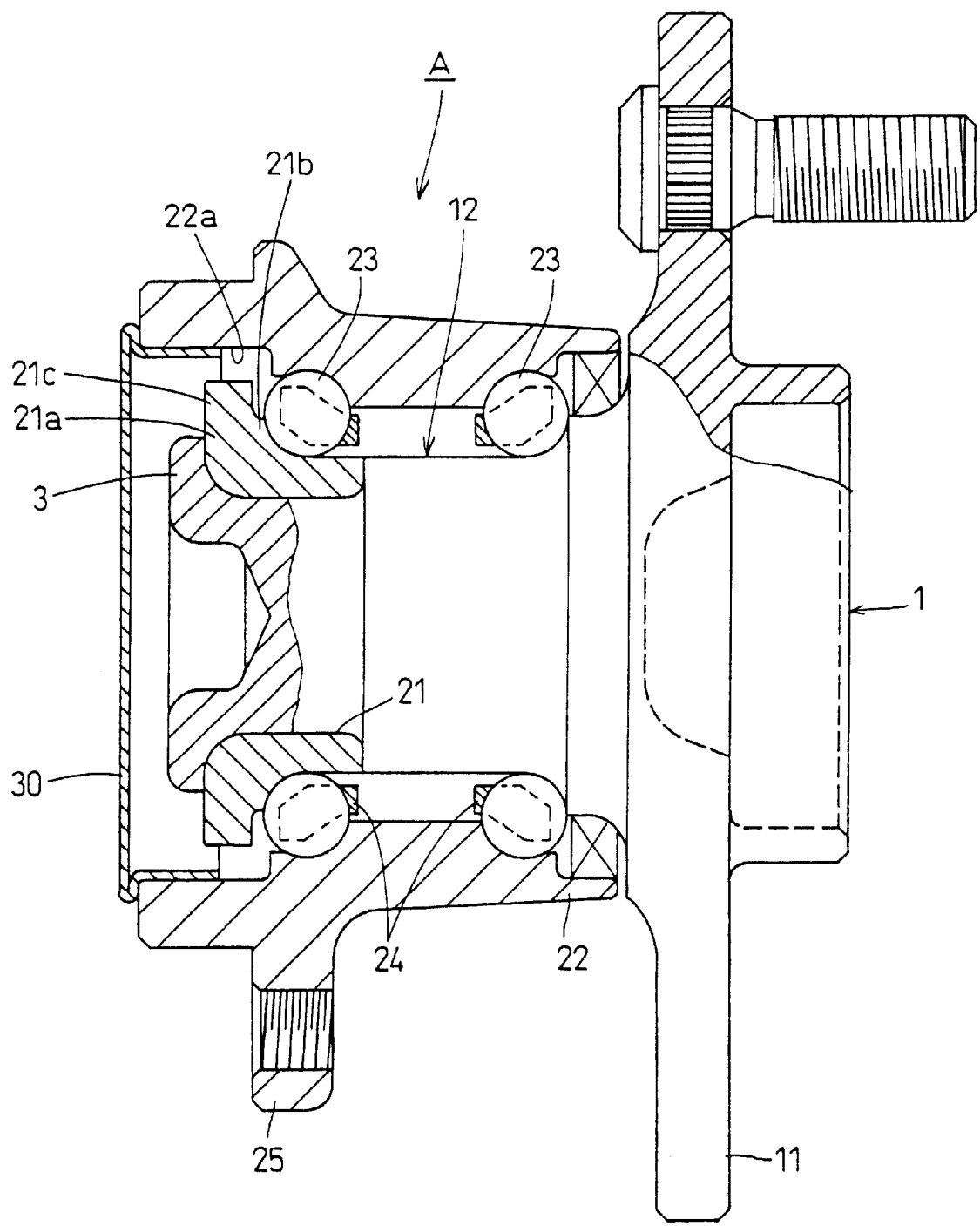
FIG. 9 is a longitudinal sectional side view of the hub unit for the vehicle after caulking in FIG. 8.
Figure 10:
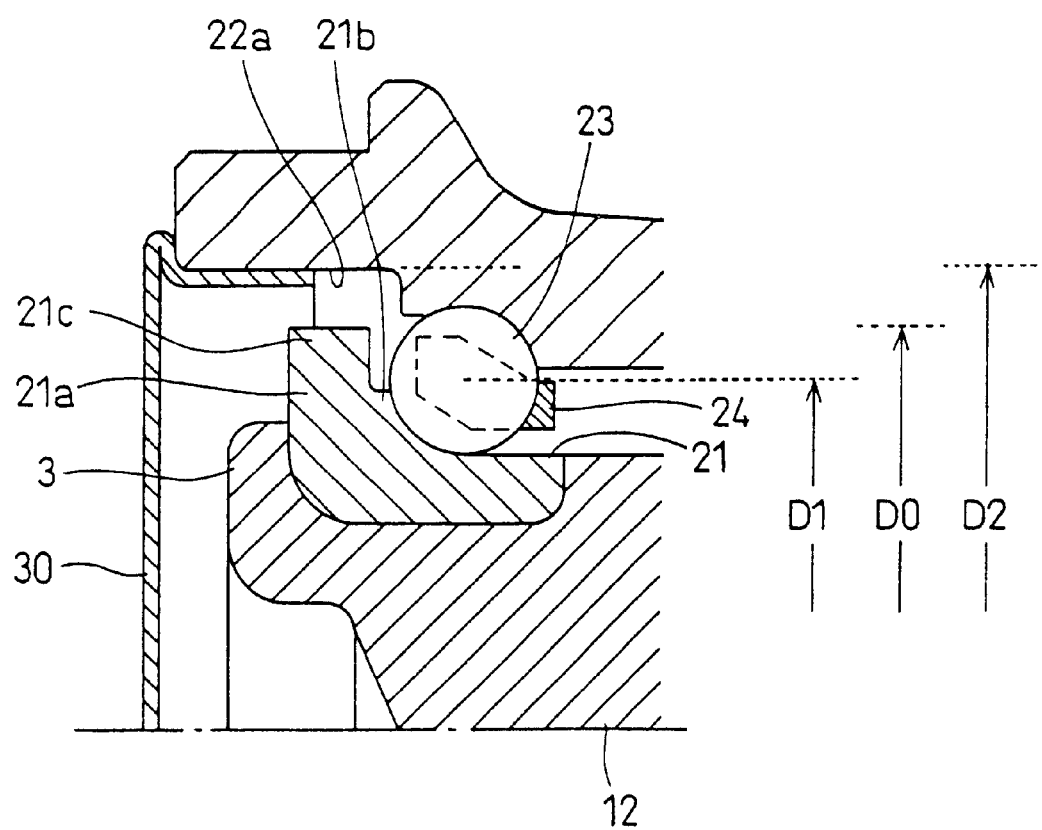
FIG. 10 is an enlarged view of a portion of FIG. 8.

Referring to FIGS. 8 to 10, a hub unit according to a second preferred embodiment of the present invention will be explained. In FIG. 9, a reference number 30 represents a lid.

In the hub unit A for a vehicle, the caulking portion 3a is bent diametrically outward and caulked on the end face of a counter bore-opposite side end 21a of the inner ring 21 of the bearing, thereby applying a pre-load to the rolling bearing and preventing the rolling bearing from falling off from the hub wheel 1.

A counter bore-opposite side shoulder portion 21b of the inner ring 21 extends from the ball 23 in a non-contacted state with respect to a standard specification product, and a thickness of the end 21a of the inner ring 21 is enlarged in a diametrical direction by the swelling portion 21c.

Because the thickness is enlarged, an outer diameter DO of the end 21a of the inner ring 21 is preferable greater than a pitch circle diameter (P.C.D.) D1 of the ball 23 and is smaller than an inner diameter D2 of the counter bore 22a of the outer ring 22.

A product having a minimum height of a shoulder portion of the inner ring 21 required for retaining around the ball 23 and having a pitch circle diameter of the ball 23 equal to or smaller than D1 is defined as the standard specification product. In the case of the above structure, the rigidity of the end 21a of the inner ring 21 is increased by the swelling portion 22a.

Therefore, even if the forging tool is rolled to bend and deform the caulking portion 3a shown in FIG. 8 diametrically outward to caulk the caulking portion 3a on the end face of the end 21a of the inner ring 21, and the caulking force is applied to the end 21a of the inner ring 21, since the rigidity of the end 21a is increased, the end 21a is not deformed by the caulking.

If the outer diameter of the end 21a of the inner ring 21 is defined as DO, the pitch circle diameter P.C.D. of the ball 23 is defined as D1, and the inner diameter of the counter bore 22a of the outer ring 22 is defined as D2, a relation of size of these elements is D1<DO<D2. A more preferable range for increasing the rigidity of the end 21a of the inner ring 21 is 0.15<(DO−D1)/(D2−D1)<0.75.

As a material of the inner ring 21 is high-carbon steel chromium bearing steel under JIS standard, but the material is not limited to this.

Therefore, the raceway part of the inner ring 21 is not affected by the caulking, and the raceway is not deformed by the caulking. Thus, the circularity of the raceway is maintained and the bearing accuracy is maintained.

Moreover, since the end 21a of the inner ring 21 is not deformed by caulking, a tensile stress in a circumferential direction is not applied to the raceway of the inner ring 21 by caulking. As a result, fatigue of the bearing is reduced and the life span is not shortened by caulking.

Further, since the thickness of the entire inner ring 21 is not set thick, it is unnecessary to reduce the inner diameter of the inner ring, i.e., to reduce the shaft diameter of the hub wheel 1. Therefore, the caulking portion 3a can be caulked without deforming the inner ring 21 while maintaining the strength of the hub wheel 1.

As described above, according to the hub unit of the second embodiment, the adverse probability that the inner ring 21 is deformed is largely reduced, the number of assembling steps and assembling time are reduced, and the structure of the hub unit is suitable for mass production.

Figure 12:
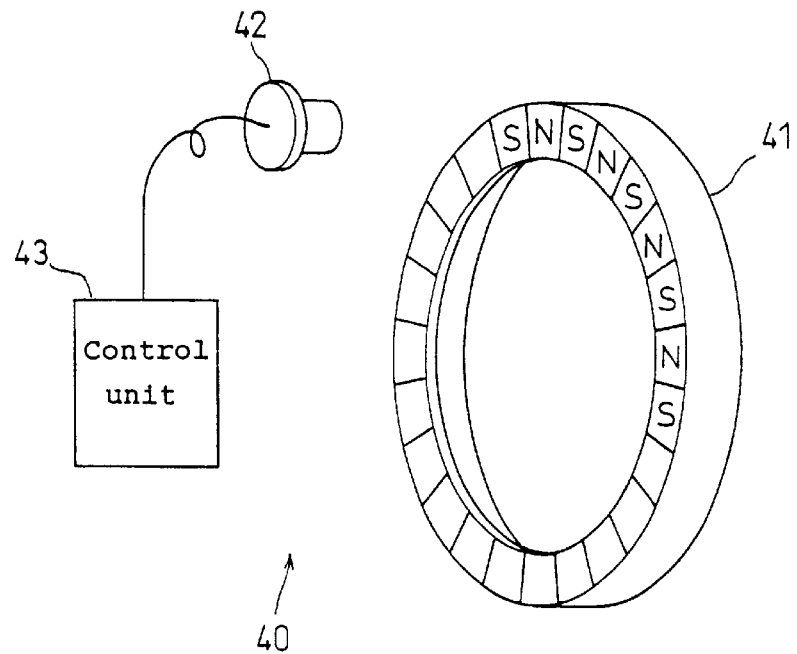
FIG. 12 is a partial exploded perspective view of a rotation-detecting device included in the hub unit for the vehicle shown in FIG. 11.

A hub unit according to a third preferred embodiment of the present invention will be explained with reference to FIGS. 11 to 13.

This hub unit A has a rotation-detecting device 40 for detecting the rotation speed of the wheel. The rotation-detecting device 40 is used when data concerning an automobile and a rotation state of the wheel is inputted into an anti-lock brake system (ABS for short).

The rotation-detecting device 40 includes a pulser ring 41, an electromagnetic sensor 42 and a control unit 43.

The pulser ring 41 is provided as a magnetic force-varying means, and mounted to an annular swelling portion 21c provided on the end 21a of the inner ring 21 of the bearing 2 which is a rotating portion of the hub unit A.

The electromagnetic sensor 42 is provided as the magnetic force-variation detecting means, and mounted to a lid 30 which is a non-rotating portion of the bearing device.

The control unit 43 is mounted to an electromagnetic sensor 42 through wiring (not shown), and includes a microcomputer and the like for calculating the rotation speed of the wheel or the like from an output signal of the electromagnetic sensor 42 and for controlling various elements.

The wheel (not shown) is mounted to an outer face of the flange 11 of the hub wheel 1. With this, a rotation speed of the vehicle corresponds to a rotation speed of the pulser ring 41, and magnetic variation of the pulser ring 41 corresponds to the rotation speed of the wheel.

The pulser ring 41 comprises a ring body in which the north poles and the south poles are alternatively arranged in the circumferential direction.

The electromagnetic sensor 42 is opposed to the purser ring 41 in the axial direction, and the sensor 42 can output an electromagnetic signal of frequency corresponding to alternate proximity period of the north poles and the south poles of the pulser ring 41.

In the control unit 43, data such as the rotation speed of the wheel from the frequency of this electromagnetic signal is calculated.

Figure 13:
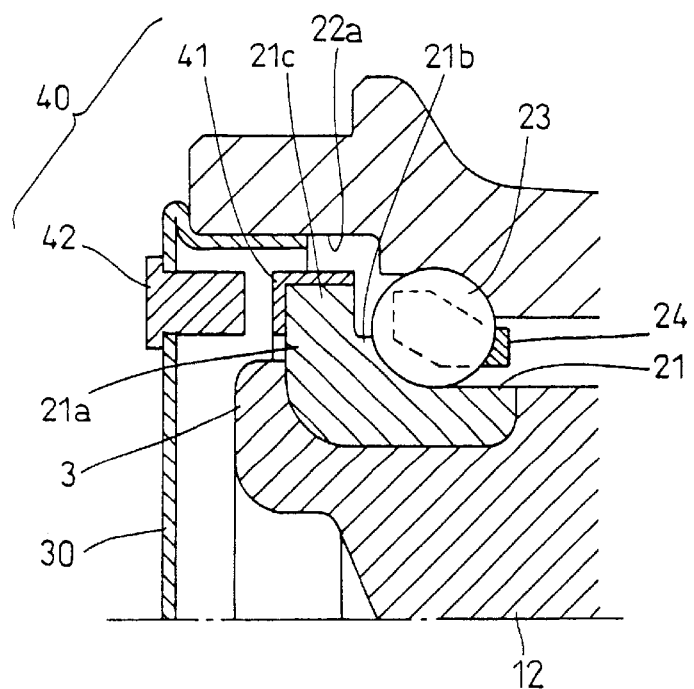
FIG. 13 is an enlarged view of a portion of FIG. 11.
Figure 14:
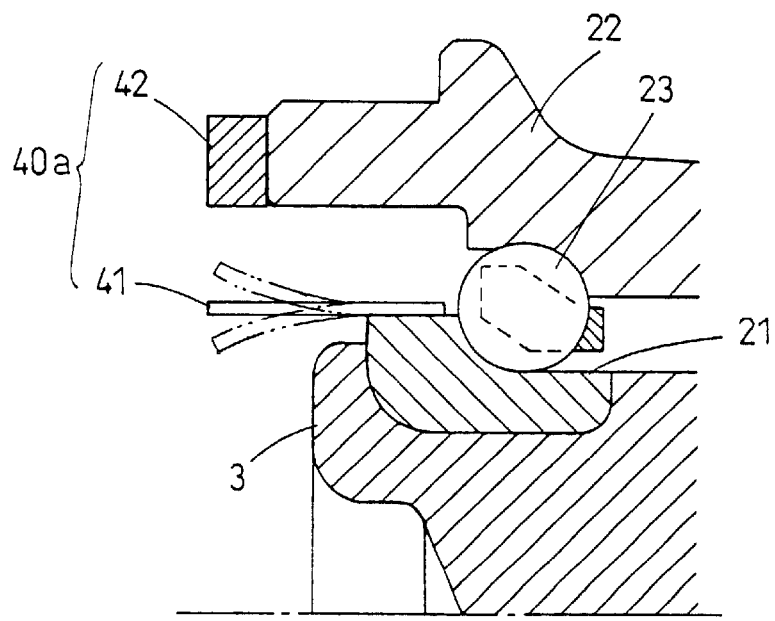
FIG. 14 is an enlarged view of a portion of a conventional device corresponding to FIG. 11.

The rotation-detecting device 40 of the third embodiment and the conventional rotation-detecting device 40a are compared and explained using FIGS. 13 and 14.

In the case of the rotation-detecting device 40 shown in FIG. 13, since the end 21a of the inner ring 21 of the bearing 2 is extended in the diametrical direction by the swelling portion 21c, the axially outer end face of the swelling portion 21c provides a wide installation space for the pulser ring 41.

For this reason, the pulser ring 41 can be disposed on the axially outer end face of this swelling portion 21c and the electromagnetic sensor 42 can be disposed such as to be opposed to the pulser ring 41 in the axial direction.

According to the rotation-detecting device 40 having the above-mentioned structure, even if a centrifugal force caused by rotation of the inner ring 21 is applied to the pulser ring 41, the pulser ring is not displaced in the axial direction, and a distance between the purser ring 41 and the electromagnetic sensor 42 is not varied in the axial direction.

Therefore, output of the electromagnetic sensor 42 which detects the alternate proximity period of the poles from the pulser ring 41 precisely corresponds to the rotation speed of the wheel, and the rotation detecting precision can be improved.

In the rotation-detecting device 40a shown in FIG. 14, since there is no swelling portion 21c, the pulser ring 41 is extended axially, the electromagnetic sensor 42 is disposed on the axially outer end face of the outer ring 22 and the pulser ring 41 and the electromagnetic sensor 42 are opposed in the diametrical direction.

Therefore, if the centrifugal force caused by rotation of the inner ring 21 is applied to the pulser ring 41, the pulser ring 41 is bent in diametrically inner and outer sides as shown with phantom lines, and it becomes difficult to keep the distance between the pulser ring 41 and the electromagnetic sensor 42 constant. If such a distance is varied in this manner, the rotation can not be detected with high precision.

In the present invention, the rotation-detecting device 40 of the third embodiment is not limited to the combination of the pulser ring 41 and the electromagnetic sensor 42 for detecting the magnetic variation.

The north poles and the south poles are alternatively arranged in the pulser ring 41 of the third concrete example, but the magnetic force variation detecting means may comprise a metal ring in which a plurality of windows (made of insulating material) are arranged in the circumferential direction at equal distances from one another or at a given interval. The electromagnetic sensor 42 may be formed such as to sense the magnetic force whenever metal portions approach and pass through the windows caused by rotation of the pulser ring 41 as with a magnetic force variation-detecting means constituted by a permanent magnet. The electromagnetic sensor 42 may generate and output a signal corresponding to the sensed magnetic force. A signal for varying a frequency of the magnetic force sensing signal in accordance with the rotation speed of the pulser ring 41 can be output. The signal may be input to the control unit 43, and the control unit 43 may detect the rotation speed from this signal.

When the hub unit in each of the above embodiments is in a state in which the outer periphery of the shoulder portion of the inner ring 21 of the bearing 2 is not restrained by the support jig, and in a state in which the shaft end of the shaft 12 of the hub wheel 1 is deformed diametrically outward to prevent the inner ring 21 of the bearing 2 from falling out, it is necessary to determine the axial force in some cases.

This axial force is an opposing force against the falling out movement of the bearing 2, i.e., a strength of the caulking portion 3, and is an axial load required to displace the bearing 2 in the axial direction.

A method for simplifying the measuring operation of this axial force and for improving the measuring efficiency will be explained with reference to FIGS. 1, 2 and 15. The axial force measuring method is divided into a preparation process and an actual working process for explanation.

In the preparation process, in a state in which the caulking portion 3 of the shaft portion 12 of the hub wheel 1 is not caulked in the diametrically outward, an axial size from the outer face of the flange 11 of the hub wheel 1 to an outer end face of the inner ring 21 of the bearing 2 is measured (first preparing step).

The axial size at that time is defined as an initial axial size WO.

Then, in a state in which the shaft end is not caulked, the axial load, i.e., the axial force is varied and applied to the bearing 2, and the axial size thereof at that time is measured (second preparing step).

Figure 15:
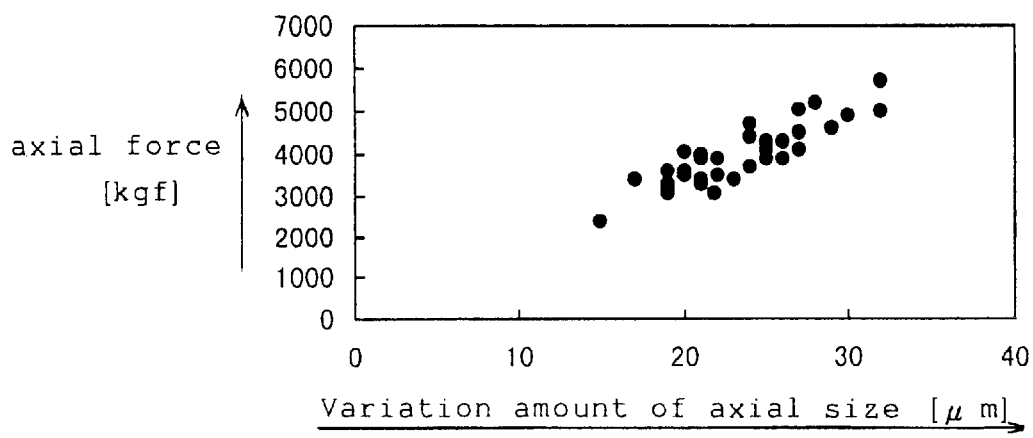
FIG. 15 is a graph showing correlation data between an axial force and an axial size variation amount of the hub unit for explaining an axial force measuring method.

A deviation between the measured axial size and the initial axial size, i.e., the axial size variation amount ΔW is obtained, thereby giving correlation data between the axial force and the axial size variation amount as shown in FIG. 15 (third preparing step).

In the following Table 1, a large number of samples are tested at different variations in caulking condition (such as pressure and the revolution number). If a graph is made based on the correlation data as shown in FIG. 15, it can be found that the correlation is substantially proportional.

TABLE 1

| Sample N0. | Axial size variation amount ΔW (μm) | Axial force (kg f) |
|---|---|---|
| 1 | 25 | 4200 |
| 2 | 19 | 3300 |
| 3 | 15 | 2400 |
| 4 | 20 | 3500 |
| 5 | 24 | 4400 |
| 8 | 25 | 3900 |
| 7 | 21 | 000 |
| : | : | : |
| : | : | : |
| 36 | 22 | 3080 |

The samples No. 8~35 are omitted.

It is unnecessary to carry out the preparation process each time the axial force is measured, and the preparation process may be carried out once. If the kind of the rolling bearing is changed, it is necessary to carry out the preparation process once again.

In the actual working process, the shaft end is actually caulked.

That is, in a state in which the shaft end 3 of the shaft portion 12 is caulked on the end face of the inner ring 21 of the bearing 2, the axial size W from the outer face of the flange 11 of the hub wheel 1 to an outside original face of the inner ring 21 of the bearing 2 is measured (first actual working step). Although the measuring process here is not illustrated, a known dial gauge or a laser length measuring machine is generally used.

A deviation between the axial size W measured in this manner and the initial axial size WO measured by the preparation process, i.e., the axial size variation amount ΔW' is obtained (second actual working step).

Afterward, the axial size variation amount ΔW' and the axial size variation amount ΔW, which is the correlation data of Table 1 prepared by the preparation process shown in FIG. 15, are collated with each other. This determines the axial load, i.e., the axial force applied to the inner ring 21 of the bearing 2 by the caulking portion 3' (third actual working step).

This collating operation can be performed by a microcomputer and the like.

According to the above-explained axial force measuring method, since the measuring process of the axial size in the actual work process does not require a sensor used for the conventional strain detecting operation, it is unnecessary to mount the sensor to the inner ring of the bearing. A wiring operation is unnecessary and thus, the operation itself can be easily and rapidly carried out. Therefore, the efficiency of the entire axial force measurement method becomes excellent. Further, since a dial gauge or the laser length measuring machine is used when the axial size is measured, the measurement is not affected by disturbances unlike the conventional strain detecting operation and thus, the measuring precision is improved. Therefore, the reliability of axial force measurement is improved.

This axial force measuring method is excellent for a pass/fail inspection for inspecting the finished state of the caulked portion of the hub unit. That is, it may be judged whether an axial force measured in the above-described manner exceeds a required axial force. With such an inspection, a degree of skill of an inspector is unnecessary as compared with a case in which the finished state of the caulked portion is visually inspected, and the reliability is improved.

The present invention can be applied to a guide roller of a sliding door of an automobile and a general bearing device.

What is claimed is:

1. A bearing device comprising;
    a shaft body having a shaft end formed into a cylindrical shape as a caulking portion; and
    an angular contact rolling bearing fitted over an outer periphery of said shaft body;
    wherein an axially outer edge of an inner ring of said rolling bearing is partially chamfered roundly with a predetermined radius of curvature,
    said caulking portion comprises a large-diameter portion having an outer diameter substantially coinciding with an inner diameter of an inner periphery of said inner ring and fitted to the inner periphery of said inner ring, and a small-diameter portion having an outer diameter smaller than the inner diameter of said inner ring before said small-diameter portion is caulked and said small-diameter portion being extended axially in one direction from said large-diameter portion through a predetermined distance, a starting point of said small-diameter portion is located closer to an axially central portion than a chamfer-starting point of the axially outer edge of said inner ring, said large-diameter portion and said small-diameter portion forming an annular step at the juncture thereof before being caulked,
    and said small-diameter portion of said caulking portion has a diametrically outward bend and caulks an end face of said inner ring of said rolling bearing so as to prevent the rolling bearing from falling out from said bearing device and to apply a pre-load to said rolling bearing.

2. The bearing device according to claim 1, wherein
    said shaft body is a wheel hub to which a wheel is mounted, said wheel hub having a shaft portion comprising a small-diameter outer peripheral face and a large-diameter outer peripheral face, a shaft end of said shaft portion is said caulking portion,
    said rolling bearing is a double row angular contact ball bearing having an inner ring of a single raceway fitted over the small-diameter outer peripheral face of said shaft portion of said wheel hub, a single outer ring having two row raceway grooves, a plurality of balls arranged in two rows, and two crown-shaped retainers, said large-diameter outer peripheral face of said shaft portion of said wheel hub is one inner ring,
    the axially outer edge of the inner ring of said rolling bearing is partially chamfered roundly with a predetermined radius of curvature, and
    said small-diameter portion of said caulking portion has a diametrically outward bend and caulks an end face of said inner ring of said rolling bearing so as to prevent said rolling bearing from falling out from said bearing device and to apply a pre-load to said rolling bearing.

3. The bearing device according to claim 1, wherein said small-diameter portion of said caulking portion includes, before said small-diameter portion is caulked, a junction having a tapered face which is reduced in diameter in one axial direction from the starting point of said small-diameter portion, and the shaft end extends in one axial direction from said junction.

4. The bearing device according to claim 3, wherein an outer diameter difference between said large-diameter portion and said small-diameter portion of said caulking portion before said small-diameter portion is caulked is 0.1 mm or less.

5. The bearing device according to claim 1, wherein a surface of said large-diameter portion of said caulking portion is grained to a finish and fitted to the inner periphery of said inner ring of said rolling bearing, and
    said small-diameter portion of said caulking portion is formed small in diameter by turning.

6. A bearing device comprising:
    a shaft body having a shaft end formed into a cylindrical shape as a caulking portion; and
    an angular contact rolling bearing having an inner ring and an outer ring fitted over an outer periphery of said shaft body;
    wherein a counter bore-opposite side shoulder portion in said inner ring of said rolling bearing is provided with a swelling portion which extends diametrically outward toward an inner face of said outer ring of said rolling bearing, a thickness of said counter bore-opposite side shoulder portion in the diametrical direction is increased by said swelling portion,
    a caulking cylinder portion of said shaft body is bent diametrically outward and caulked with a counter bore-opposite side end face of said inner ring of said rolling bearing so as to prevent said rolling bearing from falling out from said bearing device and to apply a pre-load to said rolling bearing.

7. The bearing device according to claim 6, wherein:
    said shaft body is a wheel hub to which a wheel is mounted, said wheel hub having a shaft portion comprising a small-diameter outer peripheral face and a large-diameter outer peripheral face, a shaft end of said shaft portion is said caulking portion,
    said rolling bearing is an angular contact ball bearing having an inner ring of a single raceway fitted over the small-diameter outer peripheral face of said shaft portion of said wheel hub, a single outer ring having two row raceway grooves and a counterbore on an inner face of said outer ring, a plurality of balls arranged in two rows, and two crown-shaped retainers, said large-diameter outer peripheral face of said shaft portion of said wheel hub is one inner ring,
    an outer diameter of said counter bore-opposite side end in said inner ring is set greater than a pitch circle diameter of said balls, and is set smaller than an inner diameter of said counter bore of said outer ring.

8. The bearing device according to claim 6, wherein said swelling portion of said counter bore-opposite side end of said inner ring is set such that said swelling portion does not contact said rolling bearing.

9. A bearing device comprising:
    a shaft body having a shaft end formed into a cylindrical shape as a caulking portion, said shaft body being a wheel hub to which a wheel is mounted, said wheel hub having a shaft portion comprising a small-diameter outer peripheral face and a large-diameter outer peripheral face, a shaft end of said shaft portion is said caulking portion,
    an angular contact rolling bearing having an inner ring of a single raceway fitted over the small-diameter outer peripheral face of said shaft portion of said wheel hub, a single outer ring having two row raceway grooves and a counterbore on an inner face of said outer ring, a plurality of balls arranged in two rows, and two crown-shaped retainers, said large-diameter outer peripheral face of said shaft portion of said wheel hub is one inner ring, said inner ring having a counter bore-opposite side shoulder portion in said inner ring of said rolling bearing is provided with a swelling portion which extends diametrically toward an inner face of said outer ring of said rolling bearing, a thickness of said counter bore-opposite side shoulder portion in the diametrical direction being increased by said swelling portion, wherein a caulking cylinder portion of said shaft body is bent diametrically outward and caulked with a counter bore-opposite side end face of said inner ring of said rolling bearing so as to prevent said rolling bearing from falling out from said bearing device and to apply a pre-load to said rolling bearing, and a rotation-detecting device for detecting rotation speed of the wheel comprising:

a pulser ring provided on an axially outer end face of said swelling portion for providing an electromagnetic signal upon movement of said pulser ring, an electromagnetic sensor for receiving said electromagnetic signal from said pulser ring mounted to a non-rotating portion of said bearing device and opposed to said pulser ring in the axial direction, said electromagnetic sensor providing an electromagnetic sensor output based on a rotation state of said wheel, and a control unit mounted to said electromagnetic sensor for determining a rotation state of said wheel based on the electromagnetic sensor output.

10. The bearing device according to claim 9, wherein said pulser ring is a ring body having magnetic north poles and magnetic south poles alternately arranged in a circumferential direction on said pulser ring, and said electromagnetic sensor output to said control unit is an electromagnetic signal of a frequency corresponding to an alternate proximity period of the north poles and the south poles of said pulser ring.

11. An axial force measuring method of a bearing device comprising a shaft body provided at its shaft end with a cylindrical caulking portion, and an angular contact rolling bearing fitted over an outer periphery of said shaft body, in which in order to prevent said rolling bearing from falling out from said bearing device and to apply a pre-load, an outer periphery of a shoulder portion of an inner ring of said rolling bearing is not restrained by a support jig, and said caulking portion is bent diametrically outward by rotary caulking and caulked with an end face of said inner ring of said rolling bearing, wherein:

said method includes a preparing process and an actually working process, said preparing process comprises:

a first preparing step for measuring an initial axial size of said bearing device before it is caulked, a second preparing step for varying an axial force applied to said rolling bearing to measure an axial size at that time, and a third preparing step for obtaining a variation amount of the axial size between said initial axial size measured in said first preparing step and a result of measurement in said second preparing step, thereby making a correlation data between said axial force and said variation amount of axial size, and said actually working process comprises:

a first actually working step for measuring an actually working axial size of said bearing device after it is caulked, a second actually working step for obtaining a variation amount of the axial size between said actually working axial size in said first actually working step and said initial axial size, and a third actually working step for collating said obtained variation amount of the axial size and said correlation data to recognize an axial force.

12. A bearing device comprising;

a shaft body having a shaft end formed into a cylindrical shape as a caulking portion; and an angular contact rolling bearing fitted over an outer periphery of said shaft body, said rolling bearing having an inner ring, an axially outer edge of an inner ring of said rolling bearing is partially chamfered roundly with a predetermined radius of curvature;

a rotation-detecting device for detecting a rotation state of a member rotating on said shaft body, wherein said rotation-detecting device comprises a location identifying device provided on said inner ring for providing a signal upon movement of said inner ring, a sensor device for receiving said signal mounted to a non-rotating portion of said bearing device opposed to said location identifying device, and a control unit mounted to said sensor device for processing data concerning a rotation state of said member based on a output of said sensor device, said caulking portion comprises a large-diameter portion having an outer diameter substantially coinciding with an inner diameter of an inner periphery of said inner ring and fitted to the inner periphery of said inner ring, and a small-diameter portion having an outer diameter smaller than the inner diameter of said inner ring before said small-diameter portion is caulked, and said small-diameter portion being extended axially in one direction from said large-diameter portion through a predetermined distance, a starting point of said small-diameter portion is located closer to an axially central portion than a chamfer-starting point of the axially outer edge of said inner ring, and said small-diameter portion of said caulking portion has a diametrically outward bend and caulks an end face of said inner ring of said rolling bearing so as to prevent the rolling bearing from falling out from said bearing device and to apply a pre-load to said rolling bearing.

13. The bearing device according to claim 12 wherein said location identifying device is a pulser ring for providing an electromagnetic signal upon movement of said pulser ring, said sensor device is an electromagnetic sensor for receiving said electromagnetic signal from said pulser ring mounted to a non-rotating portion of said bearing device and opposed to said pulser ring in the axial direction, said electromagnetic sensor providing an electromagnetic sensor output based on a rotation state of said member, and the control unit determines a rotation state of said member based on the electromagnetic sensor output.

14. The bearing device according to claim 13, wherein said pulser ring is a ring body having magnetic north poles and magnetic south poles alternately arranged in a circumferential direction on said pulser ring, and said electromagnetic sensor output to said control unit is an electromagnetic signal of a frequency corresponding to an alternate proximity period of the north poles and the south poles of said pulser ring.

15. The bearing device according to claim 1, wherein both the large-diameter portion and the small-diameter portion are each in the shape of a cylinder which extends axially along the shaft end.

* * * * *